Patented Dec. 4, 1951

2,577,484

UNITED STATES PATENT OFFICE 2,577,484

PROCESS FOR PRODUCING STABLE SILICA SOLS

Joseph M. Rule, Cleveland, Ohio, assignor to E. I. du Pont de Nemours & Company, Wilmington, Del., a corporation of Delaware No Drawing. Application September 8, 1950, Serial No. 183,901

13 Claims. (Cl. 252—313)

This invention relates to processes for producing improved silica sols, and is more particularly directed to a process comprising building up the size of particles in a substantially salt-free silica sol of substantially spherical, unaggregated, dense particles by adding to such a sol a substantially salt-free sol of active silica and heating the combined sols at above 60° C. while maintaining the pH in the range from 7.5 to 10.7, the molecular ratio of $SiO_2$ to base, expressed as $M_2O$, in the product being from 130:1 to 500:1.

In application Ser. No. 65,536, filed December 15, 1948, Bechtold and Snyder which issued as Patent No. 2,574,902 on Nov. 13, 1951 have described processes in which silica particles in a heel of previously heated silica sol are built up in size by adding further quantities of sol containing low-molecular-weight silica and heating the combined sols. They disclose that the build-up process should be carried out at a silica:alkali oxide mole ratio of from 60:1 to 130.1, and that sols may be produced having silica concentrations up to 35%.

In my copending application Ser. No. 183,902, filed concurrently herewith, I have described processes in which an alkali metal hydroxide is added to a silica sol containing built-up silica particles such as those prepared by the above-described build-up method of Bechtold and Snyder, the sol before adding the hydroxide being substantially free of soluble salts and alkalis and the amount of hydroxide added being sufficient to give the sol a silica:alkali metal oxide mole ratio of from 130:1 to 500:1, and I have claimed therein certain sol products which can also be made by processes of the present application. One of the ways described in the copending application Ser. No. 183,902, for rendering the starting sol sufficiently free of salts is to pass the sol successively through columns of cation and anion exchange resins, but it will be noted that such ion-exchange is effected on sols of build-up particles rather than on sols containing active silica.

When a silica sol is made from commercial sodium silicate solution by first removing the sodium by ion exchange, then adjusting the $SiO_2:Na_2O$ ratio to from 60:1 to 130:1, then effecting build-up of the silica particles, then deionizing the built-up sol, and finally adjusting the ratio to the desired figure by adding back alkali, it will be evident that considerable handling of the silica sols is necessary, with the usual yield losses, and that the ion-exchange facilities must be substantial. It is further evident that processes which minimize both the amount of handling of the sols and the investment in ion-exchange facilities required will offer definite economic advantages.

It is, therefore, an object of this invention to provide novel processes for making silica sols. Another object is to provide processes whereby silica sols of high purity and stability can be made from commercial grades of sodium silicate. Another object is to provide such processes in which unwanted cations and anions are removed from the sols by ion-exchange processes. Another object is to provide processes for producing silica sols which can be concentrated to high silica contents without gelling. Another object is to provide processes for producing silica sols which are stable and have $SiO_2:M_2O$ ratios in the range of 130:1 to 500:1. Further objects will appear hereinafter.

The foregoing and related objects are accomplished according to the invention by processes comprising building up the size of particles in a substantially salt-free silica sol of substantially spherical, unaggregated, dense particles by adding to such a sol a substantially salt-free sol of active silica and heating the combined sols at above 60° C. while maintaining the pH in the range from 7.5 to 10.7, the molecular ratio of $SiO_2$ to base, expressed as $M_2O$, in the product being from 130:1 to 500:1.

By the operation of a process of this invention as just described there may be produced silica sols which are stable even when concentrated to upwards of 35% $SiO_2$, at $SiO_2:M_2O$ ratios of 130:1 to 500:1, and the processes including such a concentration step constitute a preferred embodiment of the invention. The sols produced may have a silica content of, say, 40 or 45% by weight at these ratios. Such sols may advantageously be prepared according to this invention from cheap, readily available grades of commercial sodium silicate solution. The processes, in a preferred aspect, employ ion-exchange methods for removing unwanted ions to make the salt-free, active-silica sols, and may do so with a minimum of handling of the sols and of plant investment.

PREPARING SALT FREE SOL OF ACTIVE SILICA

The initial step in a process of this invention is to prepare an active silica sol which is substantially free of soluble salts. To do this it is first necessary, of course, to know how to measure the activity of silica and how to determine the salt content of a sol.

"Active silica" is silica in a form in which it may readily undergo polymerization. For instance, when sodium silicate is acidified, active silica is released. This active silica initially may be in the form of orthosilicic acid, Si(OH)$_4$, but a polymerization reaction occurs, whereby water splits out between adjacent silanol

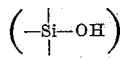

groups, with the formation of a siloxane

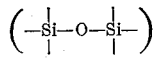

bond. This polymerization may proceed until a predominate proportion of the silanol groups present have been used up to form siloxane bonds; the polymer thus formed will have a high molecular weight and the silica in it will be predominately inactive. It will be understood, then, that by the term "active" silica is meant silica of low molecular weight in which polymerization by condensation between silanol groups has not proceeded to a predominate extent.

"Active" silica is readily identified because a sol containng silica in the active form when added to any sol of colloidal silica under the conditions of pH and temperature described more fully hereinafter builds up or increases the size of existing nuclei.

"Active" silica is also referred to in various ways, as for example in Monsanto's British Patent #19,742, dated July 27, 1949, it is referred to as "ionic" silica, which is possibly a misnomer as to the true state of the colloidal silica in the pH range 8 to 9 and under the conditions at which particle growth occurs.

It should be understood that monomeric silica is not the only active form. I have found that certain polymeric forms of silica which are capable of depolymerization under suitable conditions are active for the purposes of the present invention. The rate of depolymerization under controlled conditions provides a measure of whether or not a particular silica is active within the meaning of the term as used in describing this invention.

Active silica may be defined as any silica, in molecular or colloidal aqueous solution, in such a state of polymerization that when diluted with sodium hydroxide solution to a pH of 12.0 and an SiO$_2$ concentration of about 0.02% by weight at 30° C., in the absence of cations other than the sodium, the silica will depolymerize substantially completely, that is, at least 90%, to monomer in not more than about 100 minutes.

The amount of monomer in a particular solution may be determined by measuring the amount of color developed with molybdic acid. It was shown by Harman (J. Phys. Chem., vol. 31, 616–25 (1927)), that yellow silico-molybdic complex acid is formed by reaction of molybdic acid with "crystalloidal silica" but not with colloidal silica. I confirmed this observation, and concluded that only monosilicic acid forms the yellow complex with molybdic acid. Hence, the rate of depolymerization of silica in a dilute test solution can be followed over a period of time by taking samples and determining the amount of monomer present.

Specifically, the depolymerization test is carried out by adding the silica sample to such quantity of a dilute solution of sodium hydroxide that the pH of the mixture is 12 (corresponding to 0.01 normality of alkali) and the total concentration of SiO$_2$ is 0.02%. This mixture is held at 30° C. for a measured time after preparation, and then tested for monomer. Five ml. of the depolymerizing solution are mixed with 45 ml. of a molybdic acid reagent made up by diluting 25 ml. of M sulfuric acid and 10 ml. of 10% (by weight) ammonium molybdate solution to a total of 225 ml. The color developed in the mixture at 30° C. is followed with a Beckman Spectrophotometer, and reaches a practically constant value in two minutes. The amount of monomeric silica corresponding to this color is determined by standardizing the color against a known amount of sodium orthosilicate. The wavelength of the light used was 400 millimicrons.

While silica which depolymerizes completely in not more than 100 minutes by the foregoing test may be considered to be active, it is preferred to use silica which will depolymerize completely in not more than 50 minutes, and especially preferred to use a material on which the depolymerization time is not more than 30 minutes.

The limitation that the active silica sol must be "substantially salt-free" means that the content of soluble cations and anions must be very low. The salt content may, of course, be determined by chemical analysis, but a more rapid and feasible method of establishing that the sol is relatively free of soluble salts is to determine its specific conductance, a low specific conductance indicating the absence of current-carrying ions. I have found that when the specific conductance of a sol, as measured at 2% SiO$_2$ and 28° C., is not more than $17 \times 10^{-5}$ mho/cm., the sol is satisfactory for use in a process of this invention, and I consider such a sol to be substantially salt-free. It must be remembered that in an active silica sol the low-molecular-weight silicic acid itself contributes some conductivity, so that the actual salt content is even less than would be indicated by the specific conductance limit of $17 \times 10^{-5}$ mho/cm.

The specific conductance of a silica sol to be used in a process of this invention may be determined in accordance with conventional practices, such as that described by Glasstone, "Text-Book of Physical Chemistry," at page 874 et seq. The specific conductance is measured at 28° C. on a sol containing 2 per cent by weight of silica expressed as SiO$_2$. More concentrated sols may be diluted with distilled water for measurement.

The silica sol used as the starting material in this invention may be prepared by any method capable of giving a sol which is sufficiently salt-free and in which the silica is sufficiently active to come within the limits set forth above. Methods for liberating silica are numerous and well known, and with precautions to keep temperature down, the pH low, and reaction time short, silica can be produced in active form. Methyl silicate may be hydrolyzed with water, as taught by Brimaux, Compt. rend. 98, 105 and 1434 (1884); silicon tetrachloride may be hydrolyzed with water—see Williams U. S. Patent 1,539,342; Silicon sulfide may be hydrolyzed with water as taught by Fluery U. S. Patent 61,931; sodium silicate may be subjected to electro-osmosis as shown by Schwerin U. S. Patent 1,132,394; sodium silicate may be electrolyzed with a mercury cathode—see Collins U. S. Patent 1,562,940; or sodium ions may be removed from sodium silicate by ion-exchange resins as taught by Bird, U. S. Patent 2,244,325.

While the methods described above give sols of active silica, they will not, necessarily, be salt-free. The anion content of the sol will be considerable for instance in a process in which silicon tetrachloride is hydrolyzed, and it will be necessary to remove such anions because otherwise the salt content will become substantial as alkali is added to adjust the pH or M₂O ratio to the value desired in the subsequent steps. Such methods as dialysis, or contacting the sol with anion exchange resins, may be employed for reducing the anion content.

The method of the Bird Patent 2,244,325, above-mentioned, is particularly preferred as a way of making a sol of active silica. If the sodium silicate, from which the sodium is removed in the process, is chemically pure to start with, and if no contamination is permitted to occur in the process, the resulting sol will be and remain substantially salt-free. However, for practical operation it is most feasible, and preferred, to follow the cation-exchange process of Bird with an anion exchange process, to give a sol substantially free of both cations and anions.

In the cation-removal step, any insoluble cation-exchanger may be used, the resins of sulfonated carbonaceous exchangers, or of sulfonated or sulfited insoluble phenol-formaldehyde resins, or acid-treated humic material, or other similar exchangers, being typical. Sulfonated coal, lignin, peat, or other insoluble sulfonated humic organic material may be used. Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups. Cation-exchangers which are stable in their hydrogen forms are available commercially under such trade names as "Amberlite," "Ionex," "Zeokarb," "Nalcite," "Ionac," etc.

The exchanger should be initially in the acid form. It will be understood that to regenerate a spent exchanger to the acid form even moderately weak acids will often be sufficient particularly if the acidity is derived from carboxylic acids or even phenolic groups.

The exchanger is generally prepared in a granular form which is readily leached free of soluble acids or salts. If the exchanger is exhausted by use it may readily be converted to the acid form by washing with a solution of an acid such as hydrochloric, sulfuric, formic, sulfamic, or the like.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November, 1947, volume 69, No. 11, beginning at page 2830.

For convenience of reference, suitable silica sols from which cations have been substantially completely removed by ion exchange as just described may be referred to as "half-cycle deionized" sols.

Sols prepared according to the disclosure of the Bird patent above mentioned may contain varying amounts of anions such as sulfate, chloride, carbonate and bicarbonate, or the like. By carefully controlling the processes to avoid contamination by anions, the anion concentration, and hence, the specific conductance, may be held low enough so that the sol may be treated according to a process of the present invention without further adjustment of the anion content. Using deionized water for making up all solutions and carefully avoiding acid contamination of the sol from the regeneration of the cation exchange resin are expedients which may be followed to keep down the anion content. However, in some circumstances it is not practicable to observe these precautions and it is accordingly preferred to reduce the anion content, if required, by passing the sol through an anion-exchanger in the basic form.

Anion exchangers are generally well known, and the composition of the anion exchangers and their mode of use are fully described in the literature. Suitable materials are mentioned, for instance, in U. S. Patents 2,438,230 and 2,422,054. A description of both cation- and anion-exchangers will be found in the May, 1945, issue of "Chemical Industries," in an article entitled "Ion-exchange," by Sidney Sussman and Albert B. Mindler, at pages 789 et seq.

While any of the anion-exchangers described will be found satisfactory, the insoluble resins obtained by the reaction of formaldehyde with an aromatic amine are particularly useful. Such products are described, for instance, in the U. S. Patent 2,151,883 of Adams and Holmes. Reference is made, for instance, to the metaphenylenediamineformaldehyde type of anion-exchanger in the Ryznar Patent 2,438,230 stated above. A guanidine-type anion-exchanger may also be used.

As with the cation-exchangers, the technique of use is generally well understood and the anion-exchangers may be used in the manners customary in the art. It will be understood again that a considerable excess of anion-exchanger will ordinarily be used and the sulfate and chloride content will be lowered to an exceedingly low value.

By the treatment with the anion-exchanger the content of anions other than OH will drop to an exceedingly low figure and will not total more than about two hundredths to three hundredths of a per cent.

A silica sol which has been subjected to both cation- and anion-exchange as above described may be referred to as a "full-cycle deionized" sol.

The manner of using ion-exchange resins for making a salt-free, active silica sol may be considerably varied. The resin may be stirred into the sodium silicate or silica solution and filtered off after the ion-exchange reaction has occurred. A preferred method is to place the resin in a vertical column and percolate the ion-containing solution through it. The anion- and cation-exchange resins may be present together as a mixed bed, but for deionizing sodium silicate it is preferred that the cation-exchange precede the anion-exchange. In a column, the flow of solution may be downward, but in a particularly preferred process the flow is upward, since this somewhat extends the bed and permits the preparation of somewhat more concentrated effluents.

OUTLINE OF THE PROCESS

Processes of the invention are characterized by the building up of the particles in a substantially salt-free silica sol of substantially spherical, unaggregated dense particles. This type of sol is described in some detail in my co-pending application, Serial No. 183,902, filed concurrently herewith. The particles are substantially spherical, as distinguished from gel masses and network type of structures, and are unagglomerated, dense particles which are not joined together into anisotropic masses. This build-up can be effected as herein set out in more detail in a variety of ways, using "active" silica which is substantially salt-free.

For instance, a salt-free active silica can be heated under conditions set out below, and then further quantities of salt-free active silica added until a sol of the desired character is made. The sols thus prepared can be concentrated by evaporation.

The addition of active silica to a sol of unaggregated particles can be carried out in a variety of ways. For example, in addition to the preferred manner above described, one could prepare the active silica in situ in the sol. This is similar to the practice of the British patent application #19,742.

Silica sols of the invention preferably have an $SiO_2:M_2O$ mol ratio of 130:1 to 500:1, and can be prepared with any of a variety of bases under conditions as generally described.

The mol ratio, $SiO_2:M_2O$, herein referred to, is the number of mols of silica present, calculated as $SiO_2$, per mol of alkali metal oxide or its equivalent. In this expression, "$M_2O$" is used in accordance with common practice to represent an oxide of a monovalent cation such as lithium, sodium, potassium, rubidium, or caesium, or the the theoretical ammonium and substituted ammonium ions. When $M_2O$ is the oxide of a theoretical substituted ammonium ion, the base may be a quaternary ammonium hydroxide, such as tetramethylammonium hydroxide, or an amine such as trimethylamine, the base being soluble and sufficiently strong to have a pKa value greater than 8. The amines may contain substitution groups, as is the case with mono-, di- and tri-ethanolamines.

The oxide of a monovalent cation may be added in the form of the hydroxide or as a soluble silicate of the cation.

PREPARATION OF HEEL SOL

Having first prepared a suitably salt-free sol of active silica, the next step in a preferred process of this invention is to prepare a heel sol, or sol of silica nuclei, upon which to effect build-up.

To make the heel sol there is added to a salt-free, active silica sol a suitable amount of a sufficiently strong base such as those just described, to adjust the pH to between 6 and 9 as measured on a sample at 30° C. Having adjusted the sol to the desired pH, the sol is then heated above 60° C. to form the heel. The temperature of 60° C. is a minimum, and ordinarily it is preferred to heat to a considerably higher temperature, such as the atmospheric boiling temperature of 100° C. The heating is for the purpose of converting the low-molecular-weight silica to nuclei upon which build-up may occur in the subsequent steps of the process. The time of heating required is inversely proportional to the temperature, longer times being required at 60° C. than at 100° C. Ordinarily, heating at 100° C. for a few minutes is sufficient, and if the time required for reaching the elevated temperature is substantial, even a momentary heating at the maximum temperature is adequate.

THE BUILD-UP

After the heel has been prepared as above described, the build-up of silica upon the nuclei in the heel may be started. Build-up is effected by adding fresh, unheated, salt-free active silica sol to the heel sol while maintaining the pH in the range from 7.5 to 10.7, as measured on samples cooled to 30° C., and heating the combined sols above 60° C.

Several ways of maintaining the pH in the specified range are available, and each may be preferred, depending upon the circumstances. If, for instance, it is desired to produce a final product with an $SiO_2:M_2O$ mol ratio in the range from 130 to 300:1, the feed of fresh, active silica sol may be added simultaneously but separately with an amount of alkali calculated to maintain the ratio in the range from 130 to 300:1, the ratio being the same during build-up and in the heel. Alternatively, if a higher ratio product, say 400 or 500:1 ratio, is to be produced, all or most of the alkali may be added to the heel, and the feed may then be added to effect build-up. In another embodiment, feed sol and alkali may be added simultaneously, but separately, to the heel, the rate of adding the alkali being so controlled as to maintain the pH at a predetermined value. This value will, of course, fall within the range of 7.5 to 10.7.

It must be remembered that the pH which will result from adding a given amount of alkali will depend to some extent on the size to which the silica particles in the sol have grown. Thus, alkali is more effective in raising the pH as the particle size increases. Conversely, the ratio cannot be ascertained from the pH unless the particle size is considered.

The amount of silica added to the heel as feed should be at least equal to that originally present, and in a preferred process will be 3 to 15 times as much, or even more. As build-up continues, of course, the average size of particles grows, and for sols to be concentrated above 40% $SiO_2$, the size of particles should be grown into the range of 13 to 60 millimicrons in diameter, while for sols to be concentrated to 45%, the size of particles may advantageously be in the range of 15 to 30 millimicrons.

The combined bodies of heel and feed sol must be heated above 60° C. to effect build-up. Such heating may follow, step-wise, the addition of each small increment of feed sol, but it is by far preferable to maintain the temperature continuously above 60° C. and add the feed sol continuously.

The temperature to which the combined sols should be heated must be at least 60° C., and preferably should be higher. Excellent results have been obtained by heating to the boiling temperature at atmospheric pressure.

The heating may be carried out under pressure or reflux, but since concentration of built-up sol is usually desired anyway, it is preferred to allow free evaporation of water during the heating, and to maintain a constant volume by adding feed sol at the rate at which water is evaporated off.

In the constant volume evaporation process just described, the rate of adding active silica sol to the heel is determined by the rate at which water can be evaporated off, and in a commercial plant a period of ten or fifteen hours may be employed, but the time should not be unduly prolonged— say, to several days, nor should it be so short as to not permit the added silica to build up on the nuclei in the heel. Adding the feed over a period of an hour or two is usually not too fast.

THE SOL PRODUCTS

The built-up sols may, if desired, be concentrated to high silica contents, simply by boiling off water. They may, for instance, be concentrated above 35% $SiO_2$ and may even be concentrated to as high as 40 and 45% $SiO_2$. The constant volume build-up above-described is particularly preferred in giving these concentrated sols. The concentration may advantageously be effected by boiling the sol under rapid agitation, or under a layer of oil, or under a steam-saturated blanket, or under any other condition which prevents dehydration of the silica at the gas-liquid interface.

The sol products have $SiO_2:M_2O$ mol ratios in the range from 130:1 to 500:1. They are stable against gelation at this ratio range, even at high concentrations of silica. They enjoy a substantially complete freedom from electrolytes, and contain amorphous particles which are dense, spherical, and 10 to 130 millimicrons in diameter, as described in my copending application Ser. No. 183,902, filed concurrently herewith.

EXAMPLES

The invention will be better understood by reference to the following illustrative examples:

Example 1

A sodium silicate solution (2.5% $SiO_2$, wt. ratio $SiO_2/Na_2O=3.25$), which had been prepared by diluting a commercial sodium silicate solution (Grasselli "F" grade) with water, was deionized with Nalcite HCR resin and Amberlite IR-4B resin according to the following procedure:

The dilute sodium silicate solution was allowed to percolate through a column (2.25 x 30 inches) of the hydrogen form of the cation exchange resin Nalcite HCR and the effluent from this column was noted to possess a pH of 2.65 and to contain appreciable amounts of sulfate and chloride ions. The impure silicic acid solution thus formed was then allowed to percolate through a column (2.25 x 30 inches) of the basic form of the anion exchange resin Amberlite IR-4B in order to remove the strong acids such as hydrochloric and sulfuric. The resulting solution of low molecular weight silicic acid had a pH of 3.8, specific conductance=$1.2 \times 10^{-4}$ mho/cm., and a silica content of 2.3%. The decreased concentration of silica in the effluent appeared to be the result of dilution by the water in the ion exchange columns and not the result of an adsorption of silicic acid by the ion exchange resins.

The low molecular weight silicic acid solution was then converted to a stable silica sol by adjusting a portion (1500 ml.) of the deionized silicic acid to an $SiO_2/Na_2O$ ratio of 150 with 1 N sodium hydroxide and then boiling under reflux at atmospheric pressure for 30 minutes. The pH increased from an initial value of 7.85 to a final value of 8.75 during the refluxing of the solution. The material was then transferred to an appropriate evaporator, and the constant volume build-up commenced, according to the teaching of Ser. No. 65,536, Bechtold and Snyder, in the following manner:

The evaporator had a vaporization capacity of approximately 1.1 liter per hour and the deionized silicic acid solution was added with the appropriate amount of base at a rate which would maintain the level of the liquid in the evaporator at a constant position. During the first 8½ hours, 9.5 liters of the deionized effluent and sufficient sodium hydroxide (1 N aqueous solution) to maintain the $SiO_2/Na_2O$ ratio of 150 were added. The resulting sol had a pH of 9.5 and a viscosity of 2.25 centistokes. The remainder of the build-up was performed over a 17½ hour period by the addition of 19 liters of deionized silicic acid and the appropriate amount of sodium hydroxide to maintain the $SiO_2/Na_2O$ ratio of 150. The final sol had a pH of 9.60 and contained 44% $SiO_2$. The viscosity of this concentrated sol was 684 centistokes but upon dilution to a silica content of 10% and adjusting the pH to a value of 10, the relative viscosity measured as prescribed was 1.2. The concentrated sol was slightly opalescent in appearance but was relatively clear as compared to most common silica sols. The material did not gel upon 1 month of heated storage (95° C.), and the specific conductance, as measured at 28° C. and a silica content of 10%, was $4.8 \times 10^{-4}$ mho/cm.

This concentrated silica sol was fairly compatible with most water miscible organic solvents and could be incorporated into many polymers such as polyvinyl alcohol, natural and synthetic rubber latices, gelatin, and urea-formaldehyde polymers to yield many useful materials.

Example 2

The low molecular weight silicic acid solution ($SiO_2=2.3\%$) prepared in Example 1 could also be converted to a stable silica sol according to the following procedure:

A heel was prepared from the low molecular weight silicic acid solution (500 grams) by refluxing it with sodium hydroxide (4 ml. of 1 N aqueous solution) for a period of 30 minutes. Then an additional quantity (8500 grams) of the low molecular weight silicic acid solution and sodium hydroxide (31 ml. of 1 N aqueous solution) were added during a period of 13 hours according to the constant volume build-up procedure described above. The resulting sol of built-up particles had a pH of 8.9 and an $SiO_2/Na_2O$ ratio of 200.

The final sol did not gel during 1 month of heated storage (95° C.), and the specific conductance as measured at 28° C. and a silica content of 10% was $4.2 \times 10^{-4}$ mho/cm. An electron micrograph of the sol particles showed the silica to be in the form of discrete spherical particles with an average diameter of about 20 millimicrons.

I claim:

1. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., adding a suitable amount of a base having a monovalent cation to adjust the pH to between 6 and 9, heating the adjusted sol above 60° C. to form a heel, adding to the heel an additional quantity of a substantially salt-free sol of active silica while maintaining the pH in the range from 7.5 to 10.7, the amount of silica added being at least equal to that originally present, and heating the combined sols above 60° C., whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

2. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., adding a suitable amount of a base having a monovalent cation to adjust the pH to between 6 and 9, heating the adjusted sol above 60° C. to form a heel, adding to the heel an additional quantity of a substantially salt-free sol of active silica while maintaining the pH in the range from 7.5 to 10.7, the amount of silica added being at least equal to that originally present, and heating the combined sols above 60° C., whereby build-up of the added silica upon that present in the heel is effected, and concentrating the sol obtained to a silica concentration of from 35 to 45% by weight of $SiO_2$, total alkali additions being adjusted so that the product has an $SiO_2:M_2O$ ratio of 130:1 to 500:1.

3. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., adding a suitable amount of sodium hydroxide to adjust the pH to between 6 and 9, heating the adjusted sol above 60° C. to form a heel, adding to the heel an additional quantity of a substantially salt-free sol of active silica while maintaining the pH in the range from 7.5 to 10.7, the amount of silica added being at least equal to that originally present, and heating the combined sols above 60° C., whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

4. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., adding a suitable amount of lithium hydroxide to adjust the pH to between 6 and 9, heating the adjusted sol above 60° C. to form a heel, adding to the heel an additional quantity of a substantially salt-free sol of active silica while maintaining the pH in the range from 7.5 to 10.7, the amount of silica added being at least equal to that originally present, and heating the combined sols above 60° C., whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

5. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and a cation-exchanger in the hydrogen form and an anion-exchanger in the basic form, adding a suitable amount of a base having a monovalent cation to adjust the pH to between 6 and 9, heating the adjusted sol above 60° C. to form a heel, adding to the heel an additional quantity of a substantially salt-free sol of active silica while maintaining the pH in the range from 7.5 to 10.7, the amount of silica added being at least equal to that originally present, and heating the combined sols above 60° C., whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

6. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., adding a suitable amount of a base having a monovalent cation to adjust the pH to between 6 and 9, heating the adjusted sol above 60° C. to form a heel, adding to the heel an additional quantity of a substantially salt-free sol of active silica while maintaining the pH in the range from 7.5 to 10.7 and the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

7. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and a cation-exchanger in the hydrogen form and an anion-exchanger in the basic form, adding a suitable amount of a base having a monovalent cation to adjust the pH to between 6 and 9, heating the adjusted sol above 60° C. to form a heel, adding to the heel an additional quantity of a substantially salt-free sol of active silica while maintaining the pH in the range from 7.5 to 10.7 and the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

8. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and a cation-exchanger in the hydrogen form and an anion-exchanger in the basic form, adding a suitable amount of sodium hydroxide to adjust the pH to between 6 and 9, heating the adjusted sol above 60° C. to form a heel, adding to the heel an additional quantity of a substantially salt-free sol of active silica while maintaining the pH in the range from 7.5 to 10.7 and the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

9. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and a cation-exchanger in the hydrogen form and an anion-exchanger in the basic form, adding a suitable amount of lithium hydroxide to adjust the pH to between 6 and 9, heating the adjusted sol above 60° C. to form a heel, adding to the heel an additional quantity of a substantially salt-free sol of active silica while maintaining the pH in the range from 7.5 to 10.7, and the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, total alkali additions being adjusted so that the product has an $SiO_2:M_2O$ ratio of 130:1 to 500:1, and concentrating the silica sol obtained to a silica concentration of not more than 45% by weight of $SiO_2$.

10. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and a cation-exchanger in the hydrogen form and an anion-exchanger in the basic form, adding a suitable amount of sodium hydroxide to adjust the $SiO_2:Na_2O$ mol ratio of the sol to from 130:1 to 300:1, heating the adjusted sol above 60° C. to form a heel, simultaneously but separately adding to the heel an additional quantity of a substantially salt-free sol of active silica and a quantity of sodium hydroxide sufficient to maintain the pH in the range from 7.5 to 10.7 and the $SiO_2:Na_2O$ mol ratio from 130:1 to 300:1, and the same as in the heel, and maintaining the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, and concentrating the silica sol obtained to a silica concentration of not more than 45% by weight of $SiO_2$.

11. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and cation-exchanger in the hydrogen form and an anion-exchanger in the basic form, adding a suitable amount of sodium hydroxide to adjust the pH to between 6 and 9, heating the adjusted sol above 60° C. to form a heel, simultaneously but separately adding to the heel an additional quantity of a substantially salt-free sol of active silica and a quantity of sodium hydroxide sufficient to maintain the pH at a predetermined value within the range from 7.5 to 10.7 and the $SiO_2:Na_2O$ mol ratio in the range from 130:1 to 500:1, and maintaining the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, and concentrating the silica sol obtained to a silica concentration of not more than 45% by weight of $SiO_2$.

12. In a process for producing stable silica sols, the steps comprising preparing a substantially salt-free sol of active silica, the sol having a specific conductance, as measured at 2% $SiO_2$ and 28° C., of not more than $17 \times 10^{-5}$ mho/cm., by effecting contact, successively, between a sodium silicate solution and a cation-exchanger in the hydrogen form and an anion-exchanger in the basic form, adding a suitable amount of sodium hydroxide to adjust the pH to between 6 and 9, heating the adjusted sol above 60° C. to form a heel, adding to the heel a quantity of sodium hydroxide sufficient to give an ultimate product having an $SiO_2:Na_2O$ mol ratio in the range from 300:1 to 500:1 with a pre-determined amount of additional silica added as build-up, this amount of alkali being sufficient also to maintain the pH in the range from 7.5 to 10.7, adding to the heel containing the sodium hydroxide an additional quantity of substantially salt-free sol of active silica while maintaining the temperature at the boiling point of the sol, whereby water is evaporated, the additional quantity of sol of active silica being added at such a rate, relative to the rate of evaporation, that the volume of the combined sols remains substantially constant, and the amount of silica added being at least equal to that originally present, whereby build-up of the added silica upon that present in the heel is effected to give a sol product stable against gelation, and concentrating the silica sol obtained to a silica concentration of not more than 45% by weight of $SiO_2$.

13. In a process for producing stable silica sols, the steps comprising preparing an active silica sol having a specific conductance, as measured at 2% $SiO_2$ and 28° C., of not more than $17 \times 10^{-5}$ mho/cm., and an activity such that the silica, at pH 12 and 0.02% $SiO_2$, depolymerizes at least 90% to the monomer in not more than 100 minutes, the active silica sol being prepared by effecting contact, successively, between a sodium silicate solution and a cation-exchanger in the hydrogen form and an anion exchanger in the basic form, adding a suitable amount of sodium hydroxide to adjust the $SiO_2:Na_2O$ mol ratio of the sol to from 130:1 to 300:1; boiling the adjusted sol under atmospheric pressure to form a heel, adding to the heel an additional quantity of the original active silica sol, while maintaining the pH in the range from 7.5 to 10.7 and the temperature at the boiling point of the sol, whereby water is evaporated, the additional quantity of active silica sol being added at such a rate, relative to the rate of evaporation, that the volume of the combined sols remains substantially constant, and the amount of silica added being at least 3 to 15 times as much as that originally present, whereby build-up of the added silica upon that present in the heel is effected to give a sol product stable against gelation, and concentrating the sol to from 35 to 45% by weight of silica.

JOSEPH M. RULE.

No references cited.